(12) United States Patent
Burkard et al.

(10) Patent No.: US 6,588,047 B2
(45) Date of Patent: *Jul. 8, 2003

(54) WIPER DEVICE WITH TILTABLE MOUNTING

(75) Inventors: Hermann Burkard, Iffezheim (DE); Thomas Kotlarski, Buehlertal (DE); Juergen Reiss, Ingolstadt (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,698

(22) PCT Filed: Sep. 17, 1998

(86) PCT No.: PCT/DE98/02753
§ 371 (c)(1),
(2), (4) Date: Oct. 1, 1999

(87) PCT Pub. No.: WO95/01895
PCT Pub. Date: Jan. 19, 1995

(65) Prior Publication Data
US 2002/0069474 A1 Jun. 13, 2002

(30) Foreign Application Priority Data
Sep. 26, 1997 (DE) .......................... 197 42 505

(51) Int. Cl.$^7$ .................................................. B60S 1/06
(52) U.S. Cl. ................ 15/250.3; 15/250.31; 296/97.15; 296/97.17; 384/295; 384/296
(58) Field of Search .................... 15/250.3, 250.31, 15/250.34; 296/97.15, 97.17; 384/295, 416, 296, 276

(56) References Cited

U.S. PATENT DOCUMENTS

| | | | | |
|---|---|---|---|---|
| 2,480,043 A | * | 8/1949 | Paulus et al. ................ | 384/296 |
| 2,965,411 A | * | 12/1960 | Makela ...................... | 15/250.31 |
| 3,114,168 A | * | 12/1963 | Taylor ........................ | 15/250.3 |
| 3,962,744 A | * | 6/1976 | Bien et al. ................. | 15/250.34 |
| 4,509,878 A | * | 4/1985 | Bryson et al. ............ | 15/250.27 |
| 5,621,942 A | * | 4/1997 | Eustache et al. ........... | 15/250.3 |
| 5,675,862 A | * | 10/1997 | Reinl ........................ | 15/250.31 |
| 6,027,157 A | * | 2/2000 | Epple ........................ | 15/250.31 |

FOREIGN PATENT DOCUMENTS

| | | | |
|---|---|---|---|
| DE | 3422171 | * | 12/1984 |
| FR | 2673153 | * | 8/1992 |
| WO | 95/01895 | * | 1/1995 |

* cited by examiner

*Primary Examiner*—Gary K. Graham
(74) *Attorney, Agent, or Firm*—Michael J. Striker

(57) ABSTRACT

The invention is based on a wiper system with at least one wiper support (10,12,14,16), which, in a pre-mounted state, has a part (18) that is guided through a mounting opening (20) of a vehicle and is fastened to it. The proposal is made that while being mounted, the wiper support (10,12,14,16) rests against the rim of the mounting opening (20), tilts under the influence of gravity and as a result, is held in the mounting opening (20) with frictional, non-positive engagement and/or positive engagement.

2 Claims, 4 Drawing Sheets

WIPER DEVICE WITH TILTABLE MOUNTING

BACKGROUND OF THE INVENTION

The invention relates to a wiper system.

Usually a wiper drive mechanism of a wiper system, by way of a rod assembly, drives one or a number of drive shafts that are supported in wiper supports and have wipers attached to them. The drive shafts protrude out from openings of a vehicle body and move the wipers over a windshield of the motor vehicle. In order to be able to favorably mount the individual components or pre-mounted subassemblies of the wiper system onto the vehicle body, preferably the wiper drive mechanism, rod assembly, wiper supports, and drive shafts are pre-mounted onto a mounting plate.

The pre-mounted wiper system is correspondingly positioned and fastened to the vehicle body. Usually the wiper supports are guided through assembly openings that can be either let directly into the vehicle body or let into additional mounting plates. Then, the wiper supports are screw-mounted to the vehicle body or the mounting plate with a central nut.

Additional securing points are produced in the vehicle body in order to support the mounting. Due to the limited mounting space, these are difficult to lay out and are usually insufficient to completely and reliably secure the wiper system. Therefore while being mounted, the wiper system must be held in the appropriate position with one hand while the wiper supports must be fastened to the mounting plates with the other hand. Furthermore, the securing plates represent additional components which must be correspondingly disposed and integrated into the vehicle body, which is connected with additional expenses.

SUMMARY OF THE INVENTION

Accordingly, it is an object of the present invention to provide a wiper system which avoids the disadvantages of the prior art.

The invention is based on the knowledge that the wiper supports in the mounting openings tilt under the influence of the gravitational force of the wiper system and are consequently wedged in the mounting openings so that they do not easily fall out again up to the end of the assembly, particularly when the mounting opening is only slightly larger in diameter than the support diameter of the wiper supports.

According to the invention, the tilting motion can furthermore be used to secure the wiper supports in the mounting openings with positive engagement by virtue of the fact that when tilted, positive engagement elements are brought into a holding position behind the mounting opening. Such positive engagement elements can be suitably embodied by a shoulder on the circumference of the wiper support, which engages behind the mounting opening when the wiper support is tilted.

The completely or only partially pre-mounted wiper system is slid with the wiper supports through the mounting opening, the force of gravity tilts the wiper support in the mounting opening around a support edge, by means of which the wiper support, with its region disposed opposite from the support edge, comes into contact with the rim of the mounting opening. The wiper system is reliably and precisely fixed during further mounting. An assembler can use both hands for the further attachment without having to hold the wiper system with one hand. The mounting therefore becomes simpler, faster, more reliable, more comfortable for the assembler, and therefore becomes more reasonably priced on the whole. Additional securing devices and their assembly are no longer necessary.

Furthermore, the securing device can be easily and quickly detached during disassembly by virtue of the fact that the wiper system is lifted up counter to the tilting moment and the positive engagement and/or frictional, non-positive engagement is thereby released. Now, the wiper supports can be withdrawn from the mounting openings without thereby damaging components or having to use additional holding devices.

It is particularly advantageous if the wiper support has a shoulder on its outer circumference by way of which the wiper system can be supported counter to the mounting direction after the wiper support is slid into the mounting opening and is then wedged or engages in detent fashion.

The shoulder can be constituted by a collar that is fastened to the wiper support or is embodied of one piece with it, or can be constituted by a rim of a circumferential groove.

As a rule, it is sufficient for the shoulder to extend over only a part of the circumference of the wiper support in the vicinity of the tilting edge and/or in the diametrically opposite region. If the wiper support is inserted into the mounting opening off-center and is then centered in the mounting opening, shoulders that protrude from the circumference contour of the wiper support overlap the rim of the mounting opening and consequently produce a positive engagement which supports and secures the frictional, non-positive engagement that is produced by the gravity-induced tilting moment.

According to one embodiment of the invention, after a protruding shoulder is slid off-center through the mounting opening, the wiper support is centered in the mounting opening through the use of a centering ring and as a result, the protrusion is slid past the rim of the mounting opening. The wiper support is thus secured with positive engagement in the mounting opening before the wiper support is tilted, which prevents the danger of the wiper support slipping out from the mounting opening. Furthermore, the protruding shoulders can be disposed in arbitrary circumference regions of the wiper support.

An elastic centering ring is particularly advantageous which deforms upon insertion and then centers the wiper support by means of its elastic resilience and at the same time, slides the protruding shoulder in the mounting direction past the rim of the mounting opening and holds it in this position. The wiper support is secured in the mounting opening by the centering ring.

Preferably the mounting plate, e.g. a tubular mounting plate, is supported in the mounting direction on the rim of the mounting opening by way of a support collar on the wiper support and by way of an annular damping element on the support collar. The damping element is usually made of an elastic material and is normally installed between the vehicle body and the wiper system in order to prevent vibrations and noise from being transmitted from the component to the vehicle body.

According to one embodiment of the invention, the damping element is simultaneously embodied as a centering ring. The centering ring is thus advantageously made of elastic material and furthermore, an additional component can be eliminated. It is also possible that the protrusion is embodied by the damping element or centering ring that is fastened to the wiper support, for example by means of a tension ring or another fastener.

The wiper support usually has a tubular, cast outer part into which a support sleeve for the drive shaft is inserted. The protrusion can thus be easily cast onto the outer part in the form of one or a number of projections or in the form of a recess, by means of which additional components are eliminated. It is also possible that a projection is attached in a subsequent process, for example by means of positive engagement, frictional non-positive engagement, and/or material adhesion or that a recess is subsequently produced, for example by means of milling, etc.

In order to prevent body noise, in particular from the wiper drive mechanism, from being transmitted to the rim of the mounting opening or to the vehicle body by way of the wiper supports and the protruding shoulder, the shoulder is spaced apart from the rim of the mounting opening after the mounting is complete. The shoulder is encircled by a spacer ring, which bridges over the distance between the rim of the mounting opening and the central fastening nut and has a damping coating toward the mounting plate. The spacer ring can also be embodied of one piece with the fastening nut.

In order to prevent the vehicle body panel from being damaged during mounting and removal, in another embodiment, the wiper support can be completely or partially covered with plastic or a softer material, particularly in the vicinity of the protrusion. It is also possible for the projection or even the entire outer part of the wiper support to be comprised of softer material, for example plastic.

Moreover, a frictional connection can be supported by a corresponding coating of the wiper support. For example, with a sufficiently soft coating, ka combination between frictional and positive engagement can also be produced by virtue of the fact that the rim of the mounting opening digs into the coating.

The active lever arm that is applied by gravity decreases with the inclination angle of the wiper support to the mounting opening. As a result, the frictional, non-positive engagement and the a perpendicular force exerted on the rim by the wiper support only slightly larger than the greatest external diameter of the wiper support to be guided through the mounting opening, by means of which a positive and/or frictional, non-positive connection can be achieved with a small inclination angle, which connection has high perpendicular forces and a secure hold.

Exemplary embodiments of the invention are depicted in the drawings. Numerous features are shown and described in context in the description and in the claims. One skilled in the art can also take the features into consideration individually and can combine them into other meaningful combinations.

BRIEF DESCRIPTION OF THE DRAWINGS

FIG. 5 shows a wiper support according to FIG. 4, when slid in.

DESCRIPTION OF THE PREFERRED EMBODIMENTS

Figure 1:
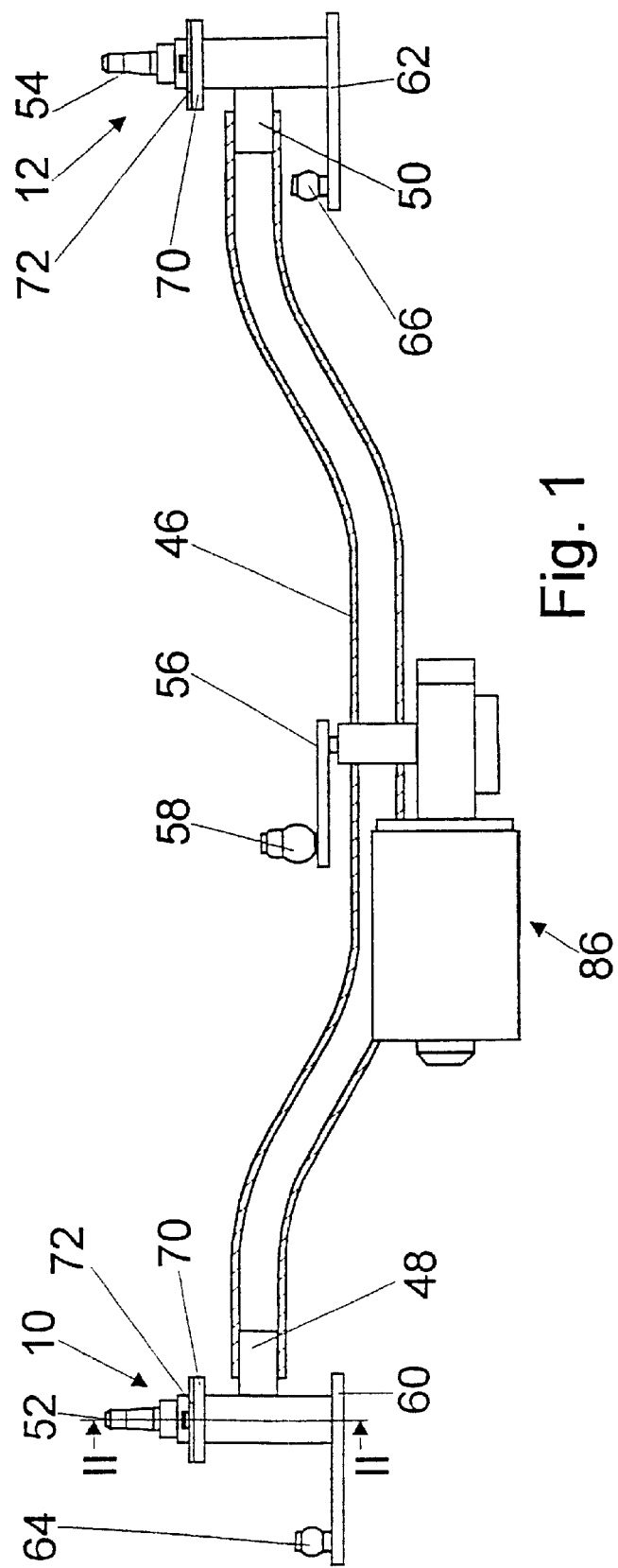
FIG. 1 shows a wiper system.

FIG. 1 shows a wiper system with a mounting plat in the form of a tubular mounting plate 46, to which a wiper drive mechanism 86 and two wiper supports 10, 12 are attached. With cylindrical fastening parts 48,50, the wiper supports 10, 12 are laterally press-fitted in an oversized fashion into the tubular mounting plate 46 or the tubular mounting plate 46 is crimped in the vicinity of the fastening parts 48, 50. Drive shafts 52, 54 are supported in the wiper supports 10,12 and are driven by the wiper drive mechanism 86 by way of a crank 56 and a joint ball 58 on the wiper drive mechanism 86, by way of a rod assembly that is not shown in detail, and respectively via a crank 60, 62 and a joint ball 64, 66 on the wiper support 10, 12.

Figure 3:
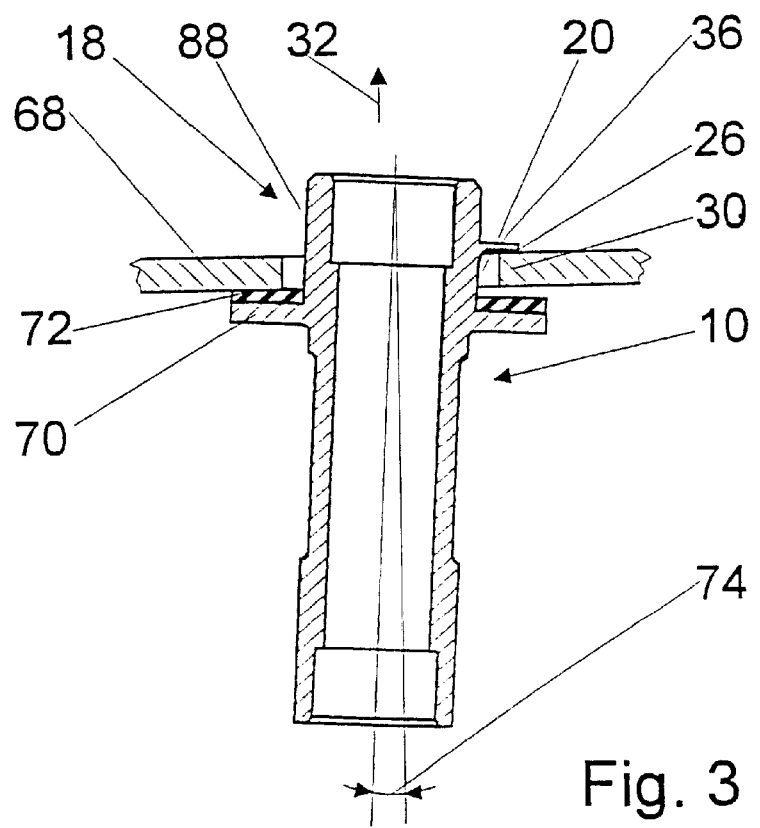
FIG. 3 shows a wiper support according to FIG. 2 when secured.
Figure 5:
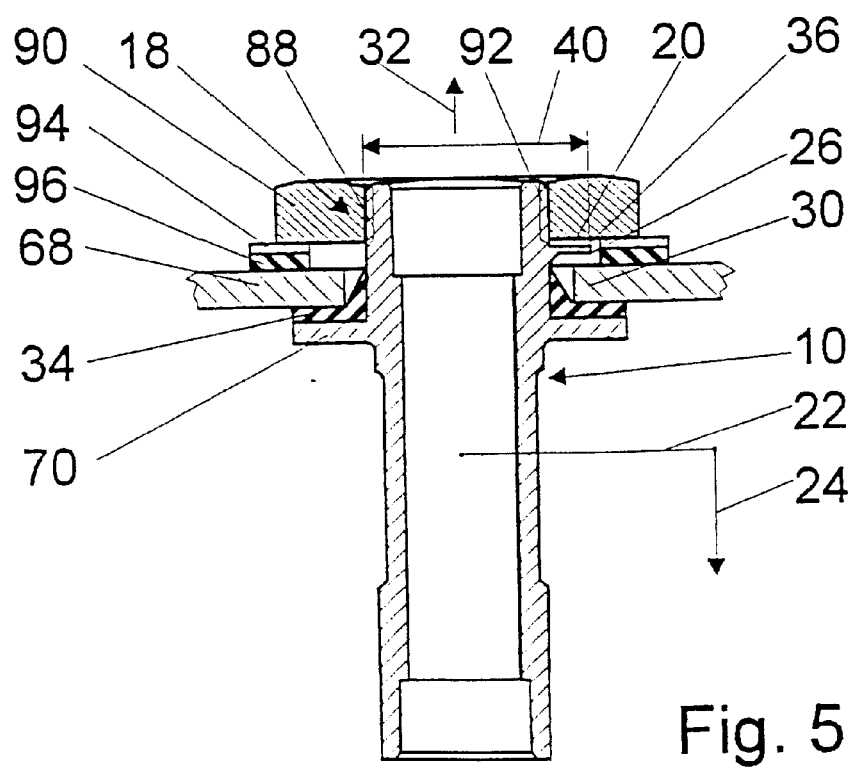

With the mounting of the wiper system, the drive shafts 52, 54 and a part 18 of the wiper support 10, 12 are slid through a mounting opening 20 in a mounting plate 68 so that the drive shafts 52, 54 protrude out from the mounting opening 20 on the vehicle body (FIG. 3). Instead of being let into a mounting plate 68, the mounting opening 20 can also be let directly into the vehicle body. On the part 18 of the wiper support 10, 12 that is slid through, there is a thread onto which a central nut 90 is screwed from the ends of the drive shafts 52, 54 (FIG. 5). The wiper supports 10, 12 are thus pulled into the mounting openings 20 until support collars 70 disposed on the outer circumference of the wiper supports 10, 12 are supported in the mounting direction 32 against the mounting plate 68 by means of a damping element 72. Then, wipers that are not shown are attached to the drive shafts 52, 54.

Figure 2:
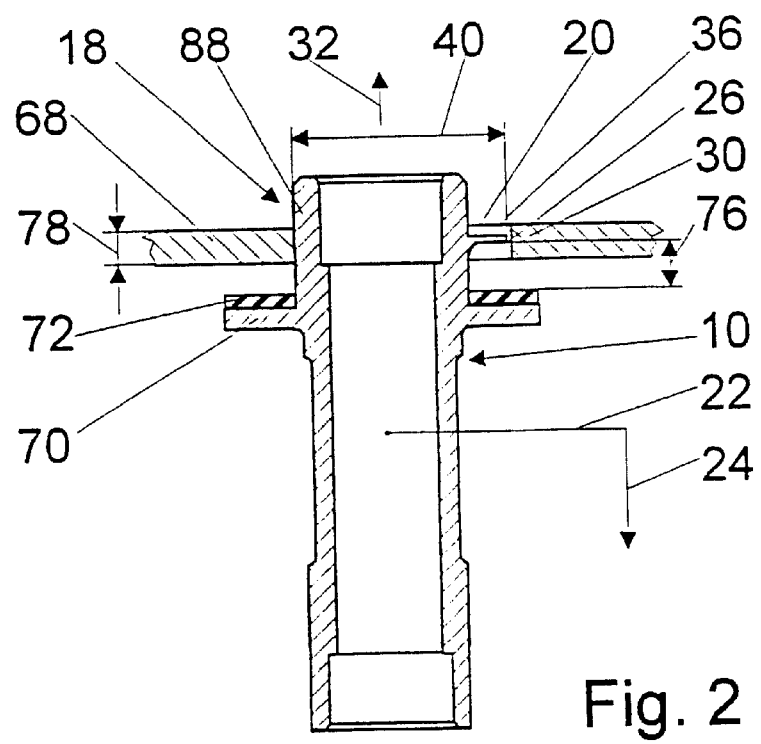
FIG. 2 shows a section along the line II—II in FIG. 1, through the outer part of the wiper support during mounting.

The gravitational force of the wiper system and in particular of the wiper drive mechanism 86 acts in the direction 24 by way of a lever arm 22 on the wiper supports 10, 12 that have been slid into the mounting openings 20, as indicated in FIGS. 2 and 5. The resulting moment is used according to the invention to secure the wiper support 10, 12, 14, 16 in the mounting opening 20 and thereby the wiper system with positive engagement or with frictional engagement until the wiper system is screwed to the vehicle body (FIGS. 1 to 7).

Figure 6:
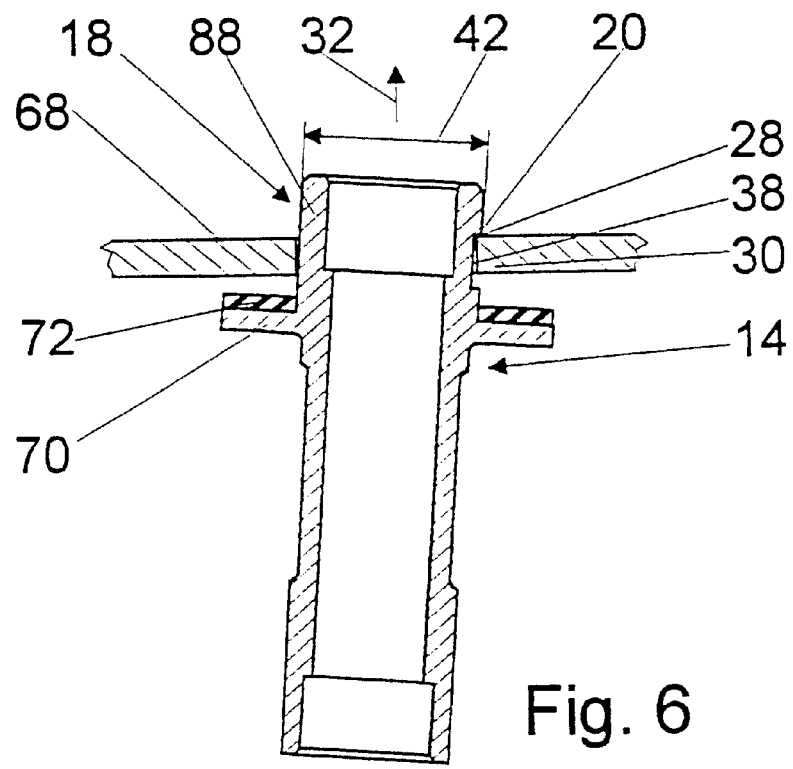
FIG. 6 shows a section through a wiper support, with a recess when secured.

FIG. 2 shows a section along the line II—II in FIG. 1 through the outer part of the wiper support 10 into which a support sleeve for the drive shaft 52 can be inserted. A projection 36 is cast onto the outer circumference of the wiper support 10 on one side, by means of which a protruding shoulder 26 is formed. The mounting opening 20 is only minimally larger than the greatest diameter 40 of the wiper support 10 to be guided through the mounting opening 20, in the region of the projection 36, so that the wiper support 10 has to be introduced into the mounting opening 20 off-center. Furthermore, the axial distance 76 between the damping element 72 and the projection 36 is only slightly greater than the material thickness 78 of the mounting plate 68. When the wiper support 10 has been inserted and centered, the projection 36 overlaps the rim 30 of the mounting opening 20 (FIG. 3). The wiper support 10 is placed against the support collar 70 and tilts under the influence of gravity so that the projection 36 is now supported on the rim 30 of the mounting opening 20. Even with a slight inclination angle 74 and a small moment, the wiper support 10 is securely held in the mounting opening 20 with positive engagement. It is also possible that the wiper support 10 is not supported with the support collar 70 or the damping element 72 on the rim 30 of the mounting opening 20, but is supported directly on the circumference, as shown in FIG. 6.

Since in the centered position of the wiper support 10, the projection 36 overlaps the rim 30, the wiper support 10 is particularly assured of not slipping out of the mounting opening 20.

After the wiper support 10 is securely held in the mounting opening 20, it can be completely screwed into position in the mounting opening 20 by means of a nut 90 and a thread on the end 88 of the wiper support 10 that points in the mounting direction 32. Thereby, the wiper support 10 is pulled against the mounting plate 68 with the damping element 72 resting against the support collar 70. The wiper support 10 is thereby aligned perpendicular to the mounting opening 20. The projection 36 is detached from the rim 30 of the mounting opening 20, which results in the fact that body noise is not transmitted from the wiper system to the mounting plate 68 and to the vehicle body by way of the wiper support 10 and the projection 36 (FIG. 5). A spacer ring 94 with a damping coating 96 is provided between the nut 90 and the mounting plate 68 and bridges over the distance between these components.

When being removed, the wiper support 10 can simply be pulled perpendicularly and eccentrically out from the mounting opening 20 without components having to be destroyed or additional fastening parts having to be detached.

Figure 4:
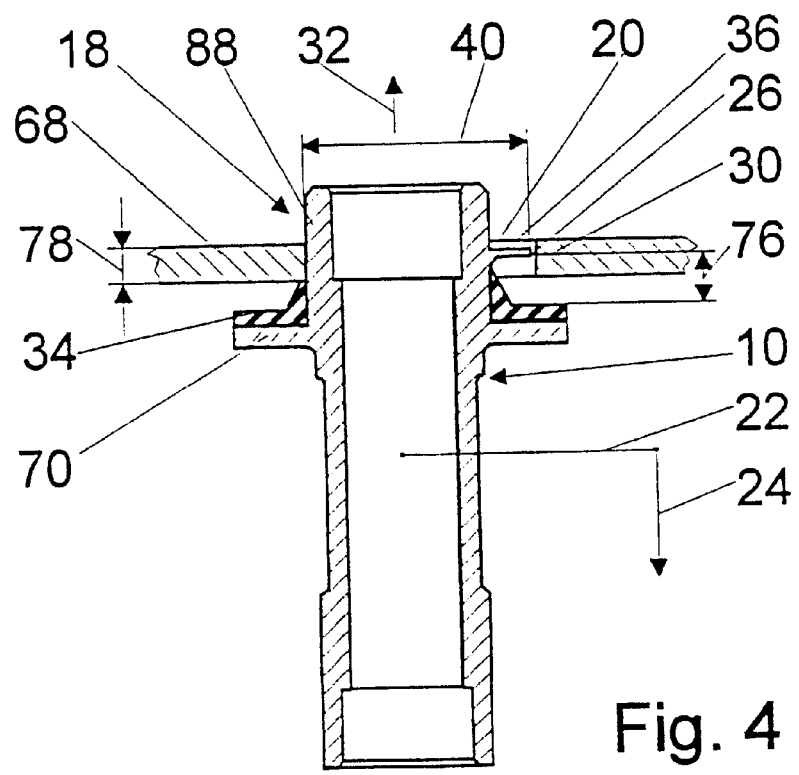
FIG. 4 shows a wiper support according to FIG. 2, with a centering ring during mounting.

In the exemplary embodiment shown in FIGS. 4 and 5, a centering ring 34 is disposed on the support collar 70 and simultaneously is a damping element. If the wiper support 10 is introduced into the mounting opening 20, an elastic deformation occurs on the side of the centering ring 34 disposed opposite from the projection 36. Once the wiper support 10 has been inserted, the centering ring 34 returns to its initial shape and thereby centers the wiper support 10 in the mounting opening 20 (FIG. 5). The projection 36 is slid by the elastic resilience of the centering ring 34 over the rim 30 of the mounting opening 20. The wiper support 10 is securely held in the mounting opening 20 by the elastic resilience before the wiper support 10 is tilted by the moment, which produces a particularly secure positive engagement. Fundamentally, it is also possible for the wiper support 10 to be held in the mounting opening 20 solely by the elastically deformable centering ring 34.

The further mounting is the same as with the wiper support 10 shown in FIG. 1. FIG. 5 shows the position of the wiper support 10 in relation to the mounting plate 68 when completely mounted. With the wiper support 14 shown in FIG. 6, instead of being formed by a projection 36, a shoulder 28 is formed by the rim of a recess 38 that is cast into the wiper support, in which the rim 30 of the mounting opening 20 engages with positive fit. On the end disposed opposite from the recess 38, the wiper support 14 is supported with its outer circumference against the rim of the mounting opening 20. The mounting opening 20 is only slightly larger than the diameter 42 of the wiper support 14, which achieves a secure positive engagement with a small inclination angle.

Figure 7:
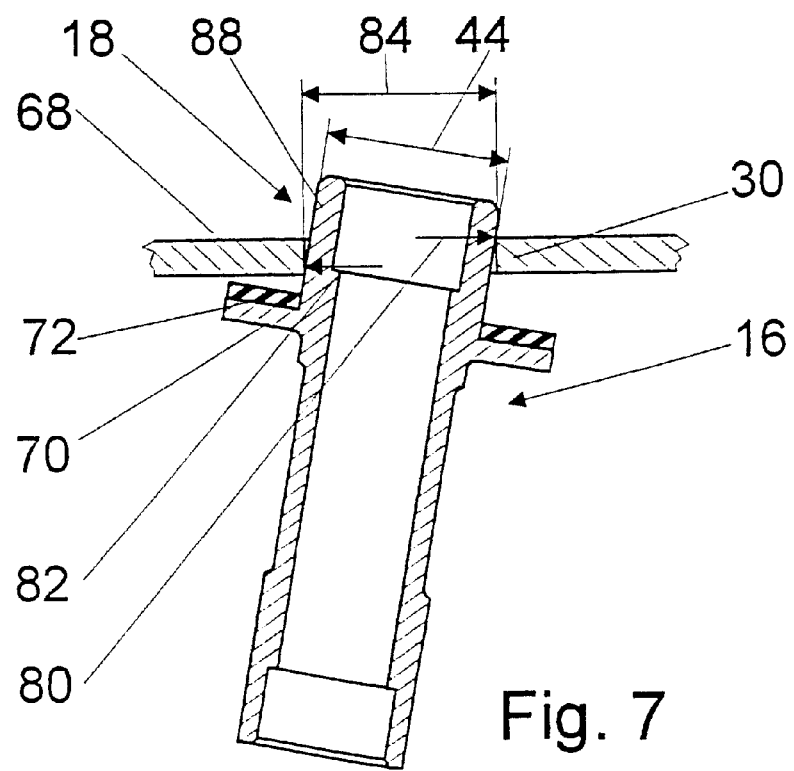
FIG. 7 shows a section through a wiper support, which is secured by means of frictional, non-positive engagement.

The wiper support 16 depicted in FIG. 7 is held in the mounting opening 20 by means of frictional engagement. The mounting plate 68 is usually thin and sharp-edged and the surface of the wiper support 16 is rough, which produces a secure frictional engagement.

The further the wiper support 16 in the mounting opening 20 is tilted, the smaller the lever arm 22 via which gravity acts on the wiper support 16 (FIG. 2) and the smaller a perpendicular force 80, 82 acting between the wiper support 16 and the rim 30 of the mounting opening 20. However, sharp-edged corners of the rim 30 of the mounting opening 20 engage more favorably in the surface of the wiper support 16 the further the wiper support 16 in the mounting opening 20 is tilted.

The diameter 44 of the wiper support 16 and the diameter 84 of the mounting opening 20 are matched to each other so that the best possible frictional engagement is achieved.

What is claimed is:

1. A wiper system, comprising a wiper support; a vehicle part having a mounting opening, said wiper support having a support part which is guided through said mounting opening of said vehicle part, said support being formed so that it rests against a rim of said mounting opening, tilts under an influence of gravity, and as a result is held in a mounting opening with frictional engagement; and a centering ring provided on said wiper support for centering said wiper support in said mounting opening.

2. A wiper system, comprising a wiper support; a vehicle part having a mounting opening, said wiper support having a support part which is guided through said mounting opening of said vehicle part, said support being formed so that it rests against a rim of said mounting opening, tilts under an influence of gravity, and as a result is held in a mounting opening with frictional engagement; a centering ring provided on said wiper support for centering said wiper support in said mounting opening; and a support collar provided on said wiper support and extending transversely to said wiper support so as to support said centering ring, said support collar being formed of one piece integrally with said wiper support.

* * * * *